United States Patent [19]

Macosko

[11] Patent Number: 4,461,319
[45] Date of Patent: * Jul. 24, 1984

[54] WATER MODULATOR

[76] Inventor: Robert L. Macosko, 9701 Nita Ave., Chatsworth, Calif. 91311

[*] Notice: The portion of the term of this patent subsequent to Mar. 24, 1997 has been disclaimed.

[21] Appl. No.: 836,668

[22] Filed: Sep. 26, 1977

[51] Int. Cl.³ ............................................... B05B 1/08
[52] U.S. Cl. .......................... 137/624.12; 137/624.14; 137/892; 239/101
[58] Field of Search ...................... 137/614.12, 614.14, 137/604, 892; 239/99, 101

[56] References Cited

U.S. PATENT DOCUMENTS

| 944,988 | 12/1909 | Slinack | 137/624.12 |
| 1,999,804 | 4/1935 | De Loria | 137/624.14 X |
| 3,747,858 | 7/1973 | Krynicki | 239/101 X |

FOREIGN PATENT DOCUMENTS 257640  5/1963  Australia ..................... 137/624.14

Primary Examiner—Robert G. Nilson
Attorney, Agent, or Firm—Paul H. Ware

[57] ABSTRACT

A device operable from a primary supply of water under pressure, such as a domestic water supply, to be used with irrigation and sprinkler systems, that modulates the flow of water supplied to different outlets, herein called supply heads, periodically from a minimum to a maximum flow rate and also provides a means by which liquid fertilizer and insecticides and the like can be dispensed and applied evenly and safely over a surface without human contact. As contemplated by the invention, supply pressure from a primary water supply is transformed into rotational motion which in turn, operates a rotary valve creating a water effluent therefrom that varies in its flow rate in accordance with the cyclical periodic operation of said rotary valve. This water effluent is delivered to the supply heads of the irrigation or sprinkler system. The rotary valve may be disabled so as to permit nearly straight-through passage of the supply water. The device of the invention may be installed in an existing irrigation or sprinkler system, preferably downstream following a conventional anti-siphon valve so as to prevent any possible chemical migration and contamination into the primary water supply. Thus, using the advantages of the invention, a more even distribution of water over a surface may be accomplished thereby reducing water consumption due to saturation watering from the attendant wasteful run-off. The device may be used with conventional automatic timers.

19 Claims, 13 Drawing Figures

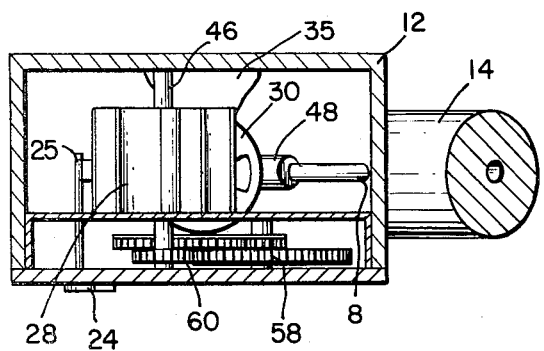
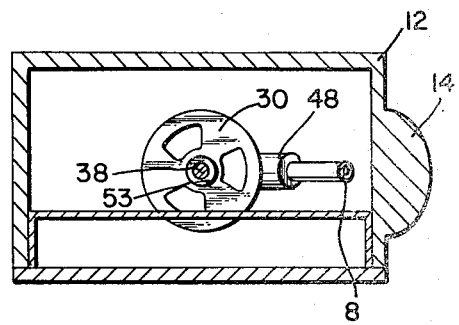
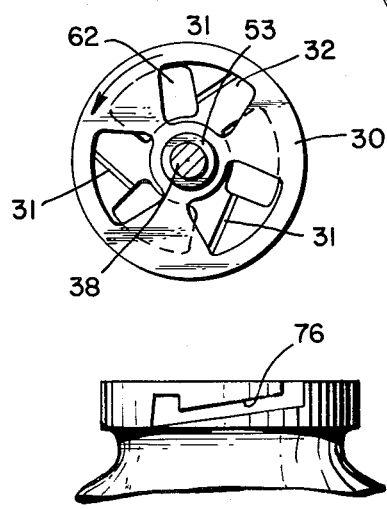
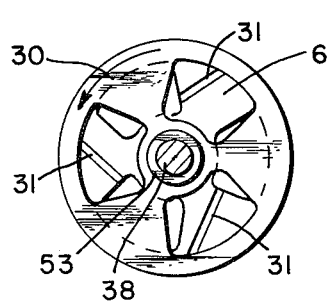
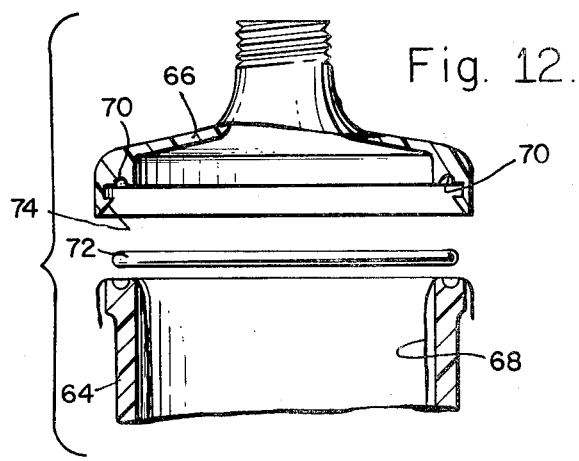

WATER MODULATOR

BACKGROUND OF THE INVENTION

1. Field of the Invention

This invention relates generally to irrigation and sprinkler water distribution systems and more particularly to such systems wherein the flow rate of distributed water is varied cyclically so as to permit efficient coverage at the extreme reach of the supply heads of such system in addition to efficient coverage adjacent said supply heads.

2. Description of the Prior Art

Water distribution systems are known in which a plurality of supply heads deliver a fixed watering pattern, and wherein various designs provide a more-or-less dispersed jet of water. Systems are also known in which distribution of supply water is delivered alternatively to each or to selected ones of a plurality of supply heads such that an intermittent supply is delivered to each head or selected ones at full pressure. While presently available sprinkler and irrigation systems can distribute a water supply evenly over a surface, it requires the employment of a great number of sprinkler heads in order to effect this result. In many cases, these supply heads are primarily arranged for sprinkling only the outer portions of areas, without any particular regard for sprinkling the portions adjacent the sprinkler head. Thus, the outer portions get the most water, while those portions adjacent the sprinkler heads get the least. Thus, water supplied to the outer portions is often wasted in run-off, while the inner portions, i.e., those portions adjacent the sprinkler heads, are inadequately supplied with water.

The basic types of sprinkler and irrigation systems are well known. Many types have been developed and have been in use for many years. However, most of these prior art devices have met special needs as presented by specific problems and have thus served narrow purposes. Some of these prior art devices have been described in the following listed patents that were brought to the attention of applicant's attorney through a novelty search conducted in the United States Patent and Trademark Office:

| Number | Title | Patentee | Date |
|---|---|---|---|
| 1,255,449 | Crude Oil Atomizer and Air Mixer | D. C. McCaig | 2-5-1918 |
| 1,616,778 | Liquid Fuel Burner Valve | J. W. Booth | 2-8-1927 |
| 1,855,647 | Sprinkling System | F. M. Pottenger, Jr. | 4-26-1932 |
| 1,999,804 | Irrigation Apparatus | A. E. DeLoria | 4-30-1935 |
| 2,081,510 | Distributing Valve | K. R. Smart | 5-25-1937 |
| 3,680,783 | Fluid Spreading Apparatus | E. M. Springer | 8-1-1972 |
| 3,747,858 | Irrigation System With Pulsating Flow | W. Krynicki | 7-24-1973 |

It would thus be a great advantage to the art to provide an irrigation or sprinkler system that could automatically create an even distribution of water over a surface that can be incorporated into existing systems.

A further desirable advantage would be the provision of means to distribute fertilizer, insecticides or the like within the capabilities of such a system.

An additional great advantage would be the conservation of water by such a system while yet providing adequate irrigation along with a minimum of waste due to run-off and other such wasteful results of present watering systems.

A still further desirable advantage would be the provision of a system whereby the pressure of a primary water supply may be utilized as motive power to operate the mechanisms of the device of the invention.

Another great advantage would be the provision of such a system in a relatively simple and economical construction.

SUMMARY OF THE INVENTION

It is thus an object of the present invention to provide an irrigation or sprinkler system that can automatically create an even distribution of water to a surface, that can be incorporated into existing irrigation and sprinkler systems.

It is a further object of the present invention to provide means to distribute fertilizer, insecticides and the like within the capabilities of the system of the invention.

An additional object of the present invention lends itself to the conservation of water while yet providing adequate irrigation along with a minimum of waste.

A still further object of the present invention is the provision of such a system as outlined in the above objects wherein the necessary motive power for the operation of the mechanisms of the device may be derived from the pressure of a primary water supply. Another very important object of the invention is to provide such a system in a relatively simple and economical construction.

In the accomplishment of these and other objects, a water modulator is provided in which a more even distribution of water over a surface using an existing irrigation or sprinkler system is accomplished thereby reducing water consumption due to saturation watering and the resultant run-off. The water flow rate is periodically varied from a near minimum which dispenses the water pattern over an area closest to the dispensing supply head, to a gradually increasing outward pattern with increasing flow rate until the maximum flow rate dispenses the water pattern over an area furthest from the dispensing head. This water pattern periodically gradually decreases from maximum to minimum over and over again. The period of one complete cycle is determined by the primary water supply system flow rate and the initial design parameters of the device of the invention. The water modulator is provided with a shut-off mechanism in order to effect near conventional system operation when such is desired. Along with this given even distribution of water over a given area, liquid fertilizers and insecticides and the like can be applied to an area more efficiently and safely. The hazard of human contact with possibly toxic fertilizers and insecticides is minimized by the employment of a self-contained, collapsible inner liner of a container whereby no direct human contact need be made with the contents of this container. If any such contact is made at all, it is with the diluted resultant of whatever fluid is being mixed with the distributed water.

In the operation of the device of the invention, water entering the top of the water modulator is directed to a water wheel by the shape of an inlet port. As water flows through the device, this water wheel is caused to rotate by the water pressure exerted against water wheel vanes attached to a water wheel shaft that is held in place by bearings and is free to rotate. This rotation of the water wheel and water wheel shaft is transmitted to a reduction gear mechanism by a spur gear attached to one end of the water wheel shaft. The reduction gear mechanism reduces the high revolutions per minute (RPM) of the water wheel and input shaft to a low RPM at an output shaft gear. This reduction gear mechanism has been designed to produce approximately one revolution per minute of a rotary valve at nominal system water flow rates in an embodiment of the invention that has been reduced to practice. The output shaft gear at the output of the reduction gear mechanism engages another gear attached to a rotary valve shaft. This rotary valve shaft is held in place by upper and lower shaft bushings in a manner so as to facilitate axial translation of the rotary valve shaft for the ON-OFF positions provided for the device. The upper shaft bushing is attached to the body of the device by an upper shaft bushing support bracket, while the lower bushing is contained in a rotary valve seat. Axial translation of the rotary valve shaft in the downward direction is restricted by a jewel endstone bearing mounted atop a siphon jet support mechanism located in the valve seat body and venturi section. The upward translation of the rotary valve shaft is restricted by the upper collar of an ON-OFF selector lever arm. A separated upper collar and lower collar mounted on the rotary valve shaft permits engagement of the ON-OFF lever arm and shaft for upward axial translation in the OFF position of the device, while permitting downward translation and rotational freedom of the rotary valve shaft in the ON position. The rotary valve is located below a collar atop the valve seat body. The ON-OFF selector arm in the OFF position, lifts this rotary valve away from its valve seat at the same time that it disengages a gear away from the output shaft gear of the reduction gear mechanism. The rotary valve and its stationary valve seat have somewhat rectangular, pie-shaped segment, cut-out areas that are aligned with each other. The somewhat rectangular, pie-shaped segment, cut-out areas of the rotary valve are larger than the similar cut-out areas of its stationary valve seat. Rotation of the valve shaft causes the related openings between the rotary valve and its stationary valve seat to decrease in effective flow area to a point of near closure. Since the open segments of the rotary valve are larger than the open segments of its stationary valve seat, there will be a continuous water flow rate for operation of the device. Water channels machined into the valve seat help to prevent seizure of the rotary valve. If there were to occur a complete cessation of water flow, there would be no motive power for continued operation of the device.

The number of cycles per revolution from maximum to minimum flow rate is determined by the number of matched segments of the rotary valve and stationary valve seat. As the rotary valve completes one revolution after another, the water flow rate is modulated from minimum to maximum and back to minimum periodically. The modulation of water flow rate creates a varying water pattern both over an area of closest proximity and to the furthest extremities from the irrigation or sprinkler system dispensing heads, thus distributing the water more evenly over a given area and reducing the amount of water needed to cover the same area at a fixed flow rate. The body and support for the stationary valve seat forms a venturi section in which a siphon jet is located. This venturi section creates a slight vacuum or suction at the tip of this siphon jet so as to draw liquid fertilizer or insecticide or the like from a container through a siphon tube. A receptor cap protects the siphon tube whose function is to penetrate a sealing septum of a container as that container's top is threaded into the receptor. An O-ring seal is fitted into the container top so as to seal a collapsible inner liner and container outer shell to prevent leakage. Locking cams prevent the container cap from disengaging during threading into and out of the receptor. Air inlet vent holes are provided at the bottom of the container shell to facilitate the collapsing of the collapsible inner liner as the fluid becomes siphoned out through the siphon tube. The slowly varying water flow rate thus evenly distributes the contents of the container over a given surface area served by the irrigation or sprinkler system.

BRIEF DESCRIPTION OF THE DRAWINGS

Further advantages and features of the present invention will be more fully apparent to those skilled in the art to which the invention pertains from the ensuing detailed description thereof, regarded in conjunction with the accompanying drawings wherein like reference characters refer to like parts throughout and in which:

FIG. 5 is a cut-away top sectional view along the line 5—5 of FIG. 2, showing detail of the water wheel and reduction gear mechanism from the top perspective.

FIG. 6 is a cut-away top sectional view along the lines 6—6 of FIG. 2.

FIG. 7 is a detail of the rotary valve showing the valve fully open.

FIG. 8 is a rotary valve detail showing the valve half open and showing the water channels machined into the valve seat.

FIG. 9 is a rotary valve detail drawing showing the valve almost closed.

FIG. 10 is an idealized perspective and partial cut-away of a container such as might be used with the invention.

FIG. 11 is a top view of the container showing the sealing septum of the inner liner thereof.

FIG. 12 is a detail drawing of parts of the container shell contemplated for distribution of fertilizer, insecticides or the like.

FIG. 13 is a detail drawing of the slot in the container for locking the cams shown in FIG. 12.

DETAILED DESCRIPTION

Although specific embodiment of the invention will now be described with reference to the drawings, it should be understood that such embodiments are by way of example only and merely illustrative of but a small number of the many possible specific embodiments which can represent applications of the principles of the invention. Various changes and modifications, obvious to one skilled in the art to which the invention pertains are deemed to be within the spirit, scope and contemplation of the invention as further defined in the appended claims.

Figure 1:
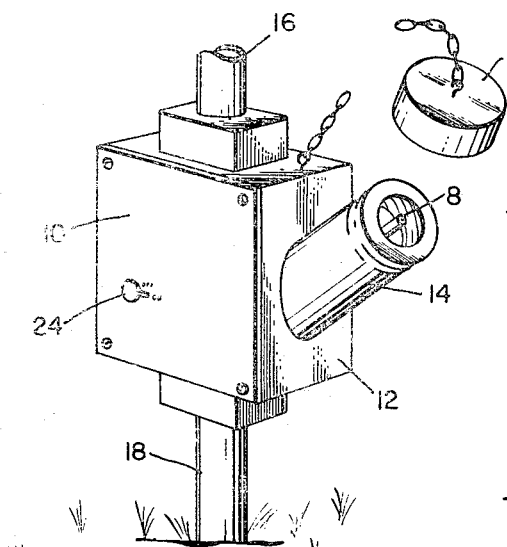
FIG. 1 is an idealized perspective view of the invention as it might be installed in an existing system.

Referring first to FIG. 1 with greater particularity, the device is shown as it would appear installed in an irrigation or sprinkler system main or feeder line following a conventional siphon valve, not shown. The inlet pipe 16 is partially shown at the top entering the device with the outlet pipe 18 shown at the bottom, entering the ground leading to the irrigation or sprinkler system supply heads. Thus the inlet pipe 16 receives water from a primary supply under pressure. Control ON-OFF selector 24, shown on front cover 10, facilitates conventional flow operation of the system with no control of flow rate in its OFF position. In the ON position, a periodic, cyclical modulation of flow rate may be obtained. The cylindrical receptor 14 for accepting fertilizers and insecticides in a container, to be described, is shown exiting the device at an angle from the device body 12. The internal threaded portion of the receptor 14 contains the siphon tube 8 which penetrates a septum in the top of a container as it is threaded into the receptor 14 thus allowing the fluid in a collapsible lining of the container to be siphoned into the device and mixed with the water being applied to an area irrigated or sprinkled. The protective and sealing receptor cap 20, attached to the device is shown removed for visibility of the siphon tube 8.

Figure 2:
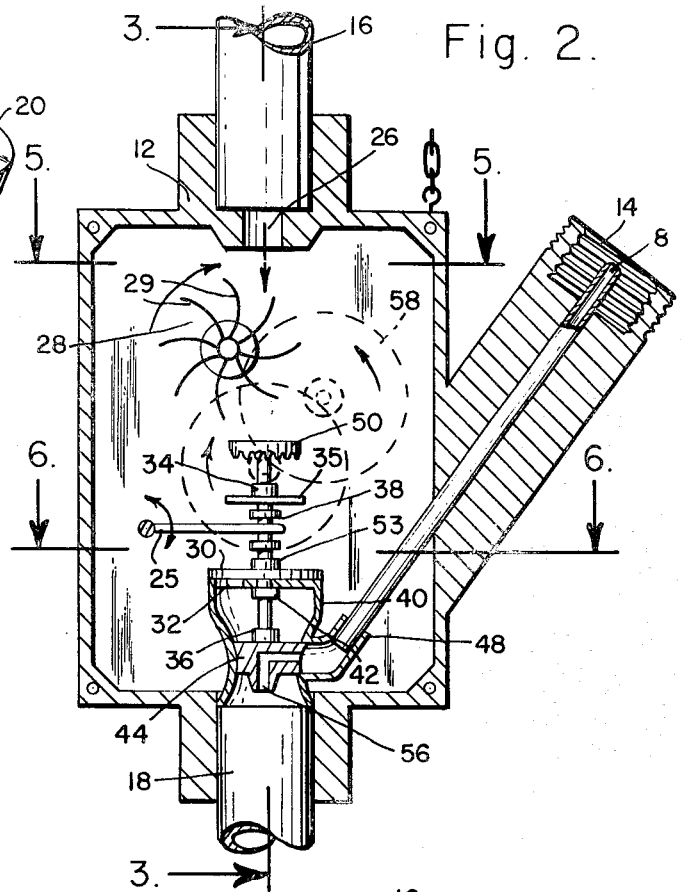
FIG. 2 is a cut-away, side sectional elevational view with front cover removed so as to expose some of the working parts of the device of the invention.

FIG. 2 shows the device with front cover 10 removed exposing the inner workings of the device. Water entering the top of the device through inlet pipe 16 is directed to a water wheel 28 by the shape of inlet port 26. As water flows through the device, the water wheel 28 is caused to rotate in the direction indicated by the arrow by the water pressure against water wheel vanes 29 attached to a water wheel shaft that is held in place by bearings and is free to rotate. This rotation of the water wheel 28 and shaft is transmitted to a reduction gear mechanism 58 by a spur gear attached to one end of the water wheel shaft. The reduction gear mechanism 58 reduces the high RPM of the water wheel 28 and input water wheel shaft to a low RPM at the output shaft gear. The output shaft gear at the output of gear reduction mechanism 58 engages another gear 50 attached to rotary valve shaft 38. The rotary valve can be engaged or disengaged from the output of reduction gear mechanism 58 by the operation of ON-OFF selector lever arm 25. This arm also lifts rotary valve 30 away from its stationary valve seat 32 in the OFF position, thus allowing a large opening for near conventional continuous water flow. The stationary valve seat body 40 is shown cut away revealing the lower rotary shaft bushing 42 and shaft jewel endstone bushing 36 located atop the siphon jet support mechanism 44. The valve seat body 40 forms a venturi section in which siphon jet 56 is located. Siphon tube 8 leads from siphon tube coupler 48 to the threaded portion of receptor 14. An upper shaft bushing utilized to facilitate axial translation of rotary valve shaft 38 is denoted by numeral 34 while its upper shaft bushing support bracket is identified by numeral 35. A collar located atop rotary valve 30 is denoted by numeral 53.

Figure 3:
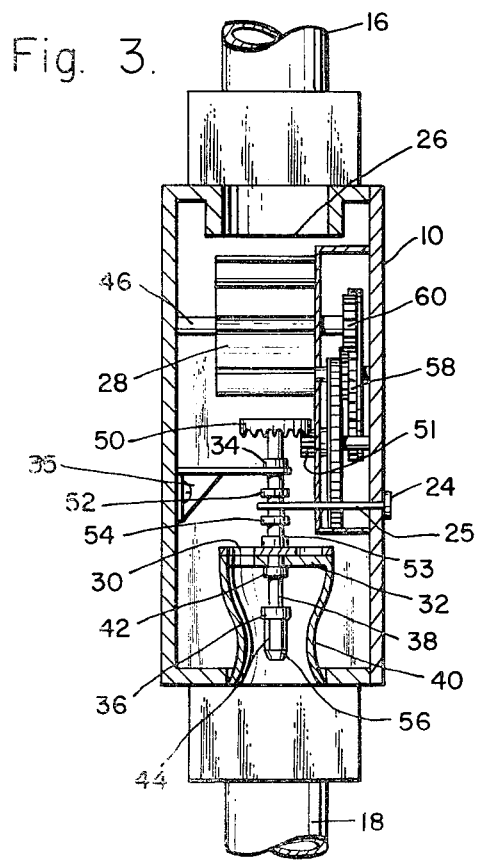
FIG. 3 is a cut-away side sectional elevation showing the device of the invention in the ON position with a cut-away detail of the valve seat body.

Referring now to FIG. 3, a cut-away side sectional view of the device is shown in the ON position with rotary valve 30 being held onto the valve seat 32 by the ON-OFF selector lever arm 25. The gear 50 is shown engaging output shaft gear 51 of the reduction gear mechanism 58. Rotation of the water wheel 28 and water wheel shaft 46 is transferred to the reduction gear mechanism 58 by a spur gear 60 attached to the water wheel shaft 46. The reduction gear mechanism 58 reduces the high RPM of the water wheel 28 at its input to a very low RPM at output shaft gear 51. The output shaft gear 51 transfers the low RPM of the reduction gear mechanism output to the rotary shaft 38 by means of gear 50. The rotary valve shaft 38 is held in place by an upper shaft bushing 34 contained in a support bracket 35 that is attached to the body of the device and a lower bushing 42 in the body of the valve seat 32. An upper collar 52 and a lower collar 54 serve as locators on the rotary valve shaft 38 for the attachment of ON-OFF selector arm 25.

Figure 4:
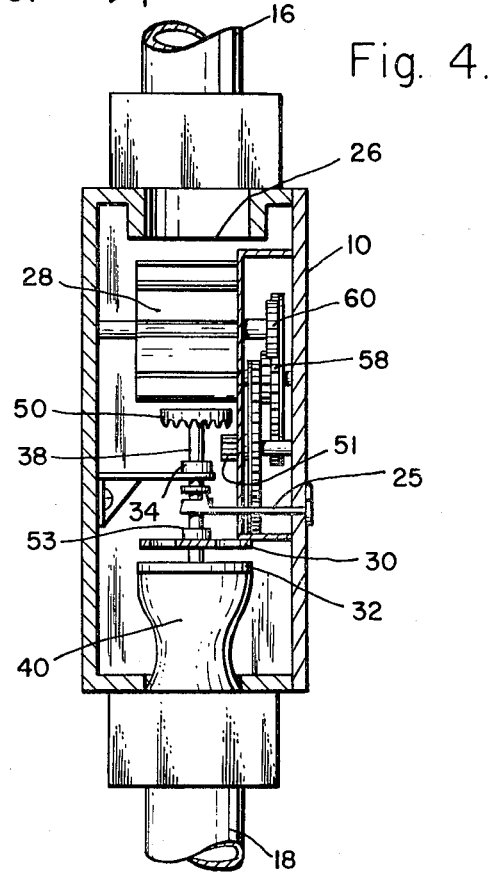
FIG. 4 is a cut-away side sectional view showing the device in the OFF position.

FIG. 4 is a cut-away side sectional view of the device shown in the OFF position, that is, with the rotary valve shaft 38 displaced in an upward axial position and held upward by ON-OFF selector lever arm 25. Rotary valve 30 is thus lifted away from the valve seat 32 and the gear 50 has been disengaged from output shaft gear 51 of reduction gear mechanism 58 thus permitting a near conventional continuous flow rate of water through the device.

Referring now to FIG. 5, there is shown a top cut-away view of the device showing water wheel 28, gear reduction mechanism 58 and a portion of rotary valve 30. Here the siphon tube 8 is shown attached to the valve seat body by means of siphon tube coupler 48.

Now examining FIG. 6 more closely, there is shown a top view of the rotary valve 30 with siphon tube 8 and siphon tube coupler 48. Rotary valve shaft 38 and collar 53 are shown in this perspective. The water wheel and gear mechanism have been removed for clarity.

FIG. 7 shows a top view of the rotary valve 30 with slightly larger open segment areas 62 than the like open valve seat segments underneath. Here the open segments of the rotary valve 30 and stationary valve seat 32 are shown as aligned for maximum flow rate through the valve.

FIG. 8 shows the rotary valve 30 rotated counter-clockwise with the open segments 62 of the rotary valve 30 and like open segments of stationary valve 32 misaligned so that the flow rate has been reduced due to the reduced open area through which the water must flow. Water channels, machined into valve seat 32 to prevent seizure of the rotary valve mechanism are denoted by numeral 31.

FIG. 9 shows the rotary valve 30 rotated still further counter-clockwise to a position where the open segments are misaligned such that the only open area through which water can flow has been provided by the slightly larger open segment area of the rotary valve than the closed segment area of the stationary valve seat. The valve seat non-open segment is identified by numeral 6. This configuration permits a minimum flow rate without a complete stoppage of water flow so as to maintain continuous operation of the device in the ON position at all flow rates. FIG. 9 also illustrates water channels 31 machined into the rotary valve seat to prevent the rotary valve from galling. The water flow through these channels is directed with the direction of rotation thus permitting a thin water film between the valve seat and rotary valve so as to eliminate the type of seizure attendant to complete absence of lubrication.

FIG. 10 shows a liquid fertilizer or insecticide container shell 64 with its cap 65 and top 66 with a threaded, necked-down section for threading into the receptor 14 of the device. Outer protective shell 64 has a collapsible inner liner 68 which contains the fluid, fertilizer, insecticide or the like to be mixed in the device for distribution. Air inlet vent holes located in the bottom of the container shell 64 to permit the inner liner 68 to collapse as the liquid is siphoned out are denoted by numeral 67.

FIG. 11 is a top view of the container top 66 showing the sealing septum 69 incorporated into top 66 that prevents the liquid in the container from leaking out when the container cap 65 is removed and the container is inverted for threading into the receptor 14. As the container top 66 is threaded into the receptor 14, the siphon t be 8 penetrates the septum 69 to allow the fluid in the container to be siphoned out.

FIG. 12 shows detail of the container top with locking cam 74 that locks the top 66 to the container 64 to prevent the top from rotating while threading and unthreading from the receptor 14. Also shown is the O-ring seal 72 and O-ring seats 70 for sealing the collapsible inner liner 68 and container outer shell 64 and top 66.

FIG. 13 shows the locking cam slots 76 on the container outer shell 64 that accept the locking cams 74 located on the container top 66. This arrangement also serves to provide a high difficulty factor for children to get at the contents of the container.

Thus there has been described a water modulator that will provide a more even distribution of water over a surface than prior art devices. Advantages resulting from the employment of the device of the invention include reduction of water consumption resulting from run-off attendant to saturation watering and prevention of the water starving of areas close to sprinkler heads. Great improvements in economy of available water, flexibility and operating efficiency have been provided through the novel advantages of the invention.

It is pointed out that although the present invention has been shown and described with reference to particular embodiment, nevertheless, various changes and modifications obvious to one skilled in the art to which the invention pertains are deemed to lie within the purview of the invention.

What is claimed and desired to be secured by Letters Patent of the United States is:

1. In a water modulator, operable from a primary supply of water under pressure, to be used with irrigation and sprinkler systems that operate cyclically to periodically vary the flow of water provided to the supply heads of said system so as to gradually decrease said flow of water from a maximum flow rate to a minimum flow rate and contra, the combination comprising:
    means for receiving water from said primary supply under pressure;
    means for transforming the supply pressure of said received water into rotational motion;
    means for cyclically, periodically opening and closing a rotary valve;
    means introducing said received water into said periodically opening and closing rotary valve to create a slowly varying water effluent therefrom;
    means for delivering said water effluent from said from said rotary valve to the supply heads of said system;
    means for mixing other fluids with said varying water effluent; and
    means for disabling said rotary valve so as to permit said water from said primary supply under pressure to proceed through said water modulator virtually unimpeded.

2. The water modulator of claim 1 wherein said means for transforming the supply pressure of said received water into rotational motion comprises:
    a device body having a water wheel rotatably mounted therein;
    a spur gear responsive to rotation of said water wheel;
    reduction gear mechanism responsive to rotation of said spur gear so as to alter the rate of the rotation; and
    an output shaft gear responsive to said altered rate of rotation and transmitting said altered rate of rotation to another gear.

3. The device of claim 2 wherein said water wheel is attached to a rotatable water wheel shaft that is itself secured to the device body by means of bearings.

4. The device of claim 3 wherein said spur gear is attached to said water wheel shaft.

5. The water modulator of claim 2 wherein said means for cyclically, periodically opening and closing a rotary valve comprises:
    a valve seat body;
    a siphon jet support mechanism mounted in said valve seat body;
    a jewel endstone bushing mounted atop said siphon jet support mechanism;
    a rotary valve seat formed as the upper part of said valve seat body;
    a lower bushing contained in said rotary valve seat;
    a rotary valve radially symmetrical with said rotary valve seat and in disengageable close proximity thereto;
    a collar centrally attached to said rotary valve; and
    a rotary valve shaft attached at one end to said another gear and located within said device body by means of an upper shaft bushing, itself secured by means of an upper shaft bushing support bracket fixedly attached to the device body, said rotary valve shaft projecting axially through the rotary valve by means of said collar and through the rotary valve seat by means of said lower bushing and thence into said jewel endstone bushing.

6. The device of claim 5 wherein said valve seat body is formed so as to define a venturi section.

7. The device of claim 5 wherein said siphon jet support mechanism contains a siphon jet.

8. The device of claim 5 wherein said rotary valve is a disc having somewhat rectangular, pie-shaped segment cut-out apertures.

9. The device of claim 8 wherein said rotary valve seat has cut-out apertures similar but somewhat smaller than those of said rotary valve.

10. The device of claim 9 wherein said rotary valve seat has water channels machined into its upper surface.

11. The water modulator of claim 10 wherein the means introducing said received water into said periodically opening and closing rotary valve to create a slowly varying water effluent therefrom comprises:
    an inlet pipe;
    an inlet port in fluid communication with said inlet pipe; and
    a device body to which said inlet pipe is attached.

12. The water modulator of claim 6 wherein said means for mixing other fluids with said varying water effluent comprises:
    a siphon jet formed in the venturi section and supported therein by the siphon jet support mechanism;

a siphon tube connected to said siphon jet by a siphon tube coupler;

a receptor attached to said device body at a proximate end thereof and having interior and exterior threads at its distal end within which said siphon tube is supported; and means for introducing other fluids to be mixed into said siphon tube.

13. The water modulator of claim 12 wherein said means for introducing other fluids to be mixed into said siphon tube comprise:

a cylindrical, bottle-like container shell having a threaded, necked-down top for threading into said receptor;

a sealing septum situate in said container shell top for introduction into said receptor so as to be penetrated by said siphon tube; and means to prevent said top from dislocating from said container shell during threading into or out from said receptor.

14. The water modulator of claim 13 wherein said means to prevent dislocation includes locking cams and locking cam slots.

15. The water modulator of claim 14 wherein said cylindrical, bottle-like container shell has a collapsible inner liner for containing said fluid to be mixed and said container shell has air vent holes fabricated into its bottom so as to permit the inner liner to collapse during dispensation of a fluid to be mixed.

16. The device of claim 15 having means to interseal said container shell, said collapsible liner and said top, said means comprising an O-ring and O-ring seats fabricated into said container shell and container top.

17. The water modulator of claim 5 wherein said means for disabling said rotary valve so as to permit said water from said primary supply under pressure to proceed through said water modulator virtually unimpeded comprise:

an ON-OFF selector arm having one end attached to said rotary valve shaft;

an ON-OFF selector mounted on a cover of said device body in operative relation to said ON-OFF selector arm.

18. The device of claim 17 wherein operation of the ON-OFF selector to its OFF position effects motion of the ON-OFF selector arm so as to move the rotary valve away from its proximity to the rotary valve seat.

19. A water modulator comprising in combination:

a device body containing an inlet port to which is attached an inlet pipe;

a water wheel having vanes so positioned as to be impinged upon by fluid entering said device body by means of said inlet port;

a water wheel shaft rotatably connecting said water wheel to said device body;

a spur gear attached to said water wheel shaft;

reduction gear mechanism engaged with said spur gear and operable to reduce the rate and transmit any rotation thereof;

an output shaft gear operable to transmit rotation of said reduction gear mechanism to another gear;

a rotary valve interfacing and engaged with a rotary valve seat and located thereto by means of a rotary valve shaft connected at one end to said another gear and at its other end to a jewel endstone bushing, said rotary valve shaft passing through said rotary valve and said rotary valve seat along its axial dimension and maintained thereto by means of bushings;

a valve seat body containing said rotary valve seat and said jewel endstone bushing and formed so as to define a venturi section;

a siphon jet located in said venturi section;

a siphon tube connected to said siphon jet by means of a siphon tube coupler;

a receptor attached to said device body and supporting said siphon tube;

a fluid container attachable to said receptor and said siphon tube; and an ON-OFF selector arm operable simultaneously to disengage said rotary valve from said rotary valve seat and to disengage said another gear from said output shaft gear.

* * * * *